Figure 1:
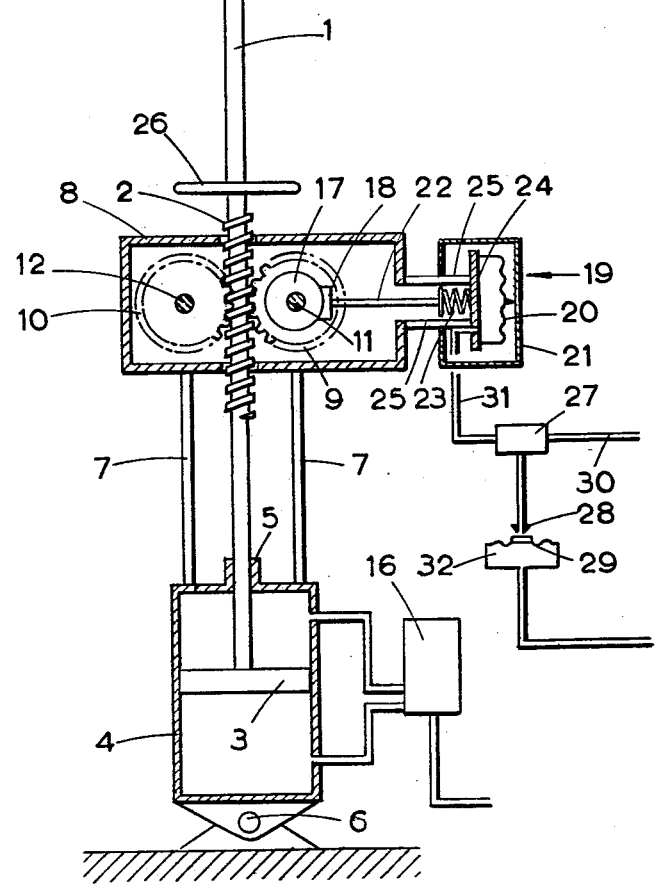

Dec. 12, 1961          J. J. ABRAHAM          3,012,448

MOVEMENT OR POWER TRANSMISSION MECHANISMS

Filed Oct. 4, 1960          2 Sheets-Sheet 1

INVENTOR
JOHN JAMES ABRAHAM

BY

*Lawrence H. Paxton*

AGENT

INVENTOR
JOHN JAMES ABRAHAM

United States Patent Office 3,012,448
Patented Dec. 12, 1961

3,012,448
MOVEMENT OR POWER TRANSMISSION MECHANISMS
John James Abraham, Redhill, England, assignor to The Foxboro Company, Foxboro, Mass., a corporation of Massachusetts
Filed Oct. 4, 1960, Ser. No. 60,367
Claims priority, application Great Britain Oct. 7, 1959
14 Claims. (Cl. 74—625)

This invention relates to movement or power transmission mechanisms and is particularly concerned with mechanisms whereby a member, such as a control valve, damper, or louvre has to be actuated by two alternative sources of power. For example, in a process control system, the controlled member may normally have to be controlled automatically by a prime mover, in the form of a pneumatic, hydraulic, or electric actuator constituting one of the sources of power, but conditions may arise in which it is necessary to actuate the controlled member manually, the person operating the apparatus then providing the second source of power.

It is one object of the present invention to provide neat and compact movement or power transmission mechanism whereby a controlled member can be actuated from two alternative power sources and, if necessary, automatically conditioned for either transmission.

According to the present invention, a movement or power transmission mechanism includes an irreversible worm gear having a worm wheel and a member formed with a worm or a screw thread in mesh with the worm wheel, means for moving the worm axially while the worm wheel rotates, means for locking the worm wheel against rotation, and means for rotating the worm about its axis while the worm wheel is locked so as to cause the worm to move axially as a result of the reaction of the locked worm wheel. In the latter event, the locked worm wheel acts as a partial nut along which the worm is screwed. Advantageously, the means for moving the worm axially while the worm wheel rotates are independent of the worm wheel itself and may consist of a fluid operated piston-and-cylinder assembly connected directly to the worm. The alternative source of power may be provided by a hand operated member connected to the worm.

Where the member controlled by the worm has to undergo movement relatively to the worm, it may be mechanically connected to the worm through a coupling which transmits axial movements of the worm both when the worm is rotated about its axis and when it is not rotated about its axis.

The means for locking the worm wheel may consist of a friction brake or clutch and this may be actuated by pneumatic, hydraulic, electric or mechanical power. The brake may, moreover, be automatically actuated as a result, for example, of a failure of the power source which moves the worm axially while the worm wheel rotates, the brake then being applied to lock the worm against simple axial movement.

Figure 2:
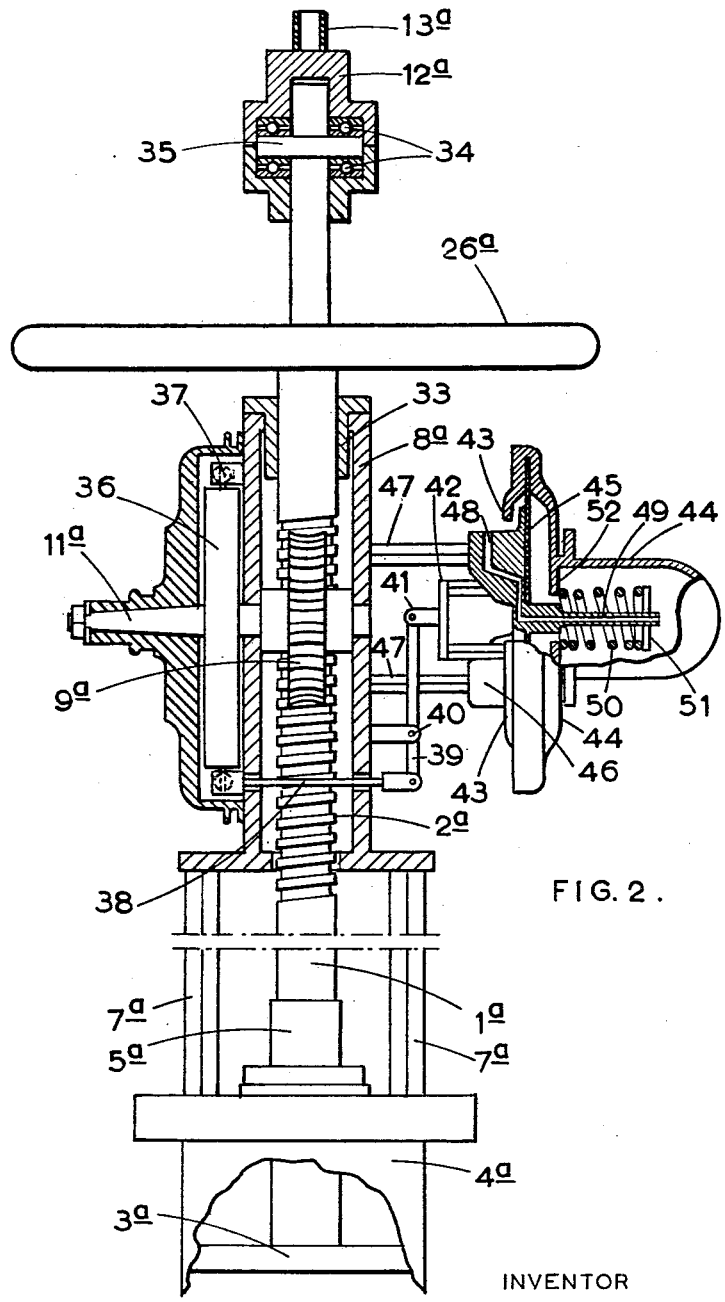

In order that the invention may be clearly understood and readily carried into effect, mechanism in accordance therewith will now be described, by way of example, with reference to the accompanying drawings, in which:

FIGURE 1 is a diagrammatic elevation of power transmission mechanism, shown partly in section; and FIGURE 2 is an elevation, shown partly in section, of a modification of a portion of FIGURE 1, the modification being shown on an enlarged scale.

In the example of FIGURE 1, a rod 1 is formed with a worm or screw thread 2 along a central portion of its length. A piston 3 is fixed to one end of the rod 1 and is reciprocable in a cylinder 4, the rod being arranged to slide to-and-fro through a bush 5 at one end of the cylinder 4. Just beyond the other end of the cylinder, the assemble comprising the rod, piston and cylinder is mounted to rock about a fixed axis 6 at right angles to, and in the same flat plane as, the rod axis. Fixed to the cylinder 4 by means of rods 7 is a casing 8 through which the worm passes with some clearance. Two worm wheels 9, 10 are mounted in the casing to rotate about parallel axes 11, 12, fixed relatively to the casing and at right angles to the rod axis. The reason for providing two worm wheels, which are located on opposite sides of the rod, is simply to locate the rod, only one 9 of the worm wheels being arranged to be locked as aforesaid. Clearly, by providing a cylindrical guide or guides for the rod 1, the additional worm wheel 10 can be dispensed with.

At its end remote from the piston, the rod 1 enters a sleeve 12 on a member 13 pivoted to a lever 14 by which a butterfly valve 15 in a conduit 16 is actuated. The rod 1 is so connected to the sleeve 12, as by a flange and groove connection therein, that the rod can rotate about its axis relatively to the said member 13, but otherwise cannot undergo any appreciable movement relatively to the said member 13.

The piston and cylinder assembly 3, 4 provide a double acting fluid actuated motor or actuator forming part of a servo system and having a valve mechanism 16 and feedback device under control of a pneumatic controller, all as well known in the art of process control, the controller being responsive to a condition controlled by the butterfly valve 15.

Coaxial with the worm wheel 9 is a brake drum 17 with which a reciprocable brake shoe 18 co-operates under the control of an air controlled diaphragm assembly 19 mounted on the casing. Normally the brake shoe 18 is held away from the drum by air pressure acting within a diaphragm unit 20 which forces a frame 21 and rod 22, carrying the brake shoe 18, to the right (as viewed in FIGURE 1) against the action of a spring 23 which bears against an abutment 24 fixed to the casing 8 by means of rods 25 which pass through the frame 21. However, in the event of an abnormal condition arising, for example, in the servo system, pneumatic pressure is released from the diaphragm unit 20 so that the spring 23 will press the shoe 18 against the drum 17. The worm wheel then is no longer free to rotate so that the rod 1 and worm 2 thereon can no longer move axially under the action of the actuator 3, 4. However, beyond the casing the rod 1 has fixed thereto a hand wheel 26, so that by rotating the hand wheel 26, and thereby turning the rod 1 about its axis, the worm 2 is fed past the locked worm wheel 9 in the appropriate direction according to the direction in which the hand wheel 26 is turned, to operate the butterfly valve 15. Of course, any pressure in the piston and cylinder assembly 3, 4 that would prevent this action must be released.

When the pneumatic pressure is once more applied to the diaphragm assembly 19, the brake shoe 18 is withdrawn from the drum 17 and the automatic action can again take place.

The pneumatic pressure supply to the diaphragm 20 is controlled by a pneumatic relay valve 27 substantially as described in patent specification No. 670,427. This relay valve 27 is under the control of a nozzle 28 and small diaphragm 29. Air escapes from the nozzle 28 at a rate determined by the relative positions of the nozzle 28 and small diaphragm 29 and the back pressure in the nozzle system determines the action of the relay valve 27 in regard to supplying pressure from a pneumatic pressure supply pipe 30, through a pipe 31 to the diaphragm unit 20. The small diaphragm 29 closes a chamber 32 in which the pressure may vary as a function of any selected variable in the servo-system.

In the modification of FIGURE 2, a rod 1a is arranged to be reciprocated either by the movement of a piston 3a in a cylinder 4a or by the turning of a hand wheel 26a, as in the mechanism of FIGURE 1, the cylinder 4a being connected by rods 7a to a casing 8a, on which the worm mechanism and brake are mounted. The rod 1a is guided in a bush 5a on the cylinder 4a and in a bush 33 on the casing 8a. The rod 1a is connected to a member 13a, which is arranged to position a valve, or other member to be controlled, by means of a sleeve 12a containing two ball thrust bearings 34 disposed on opposite faces of a flange 35 on the rod 1a. The rod 1a is, therefore, free to rotate while transmitting axial movement to the member 13a.

The worm mechanism comprises a worm 2a on the rod 1a in mesh with a worm wheel 9a carried by a shaft 11a which also carries a brake drum located around two brake shoes, one 36 of which appears in FIGURE 2. The brake shoes are hinged together at their upper ends, at 37, and are acted on by springs (not shown) which separate the shoes from the brake drum. The brake shoes are caused to grip the brake drum by a cam interposed between the lower ends of the brake shoes and controlled by a link 38 pivoted to a lever 39 which is pivoted about an axis 40, fixed with respect to the casing 8a. The lever 39 is pivoted at 41 to a frame 42 fixed to a flange 43 on a hollow member 44 sealed by means of a flexible diaphragm 45 to a member 46 fixed to the casing 8a by means of rods 47.

When gas under pressure is supplied through a duct 48 in the member 46 and a tube 49 to the space within the member 44 sealed by the diaphragm 45, the member 44 and frame 42 are moved to the right, as viewed in FIGURE 2, against the action of a compression spring 50 interposed between a flange 51 on the tube 49 and a flange 52 inside the member 44. Thus, the lever 39 is turned clockwise and the link 38 moved to the left to cause the aforesaid cam to permit the springs to separate the brake shoes from the brake drum.

It will be observed that in each of the figures the distance between the member 13 or 13a and the actuator piston 4 or 4a remains constant and that these parts are at no time disconnected. Therefore, the changeover from manual to automatic operation, and vice versa, can be effected without the necessity for special tools, or the connection or disconnection or the alignment of parts between the actuator means 3, 4, or 3a, 4a, or 26 or 26a and the member 13 or 13a.

I claim:

1. Movement or power transmission mechanism comprising, in combination, a worm wheel and a member formed with a thread in mesh with said worm wheel, means for moving said member past said wheel while said wheel rotates, means for locking said wheel against rotation, and means for rotating said member to turn said thread thereon while said worm wheel is locked so as to cause said member to move past said worm wheel along said thread as a result of the reaction of the locked worm wheel.

2. Mechanism according to claim 1, in which the means for moving the member past the worm wheel while the worm wheel rotates are independent of the worm wheel.

3. Mechanism according to claim 1 in which the two different conditions of movement of the member are effected one by manually actuated means and the other by a prime mover.

4. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, the two different conditions of movement of the member being effected one by manually actuated means and the other by a prime mover, means connected to said member and controlled as to position thereby, and coupling means comprising said connection, said coupling means formed as a transmitter of movement of said member past said worm wheel, both when said member is moved while said worm wheel rotates and when said member is moved while said worm wheel is locked.

5. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, said means for moving the member past the worm wheel while the worm wheel rotates being independent of the worm wheel, and a piston-and-cylinder assembly directly connected to said member for moving said member to-and-fro past said worm wheel when said worm wheel is free to rotate.

6. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, said different conditions of movement of the member being effected one by manually actuated means and the other by a prime mover, and a piston-and-cylinder assembly directly connected to said member for moving said member to-and-fro when past said worm wheel when said worm wheel is free to rotate.

7. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, the two different conditions of movement of the member being effected one by manually actuated means and the other by a prime mover, means connected to said member and controlled as to position thereby, coupling means comprising said connection, said coupling means formed as a transmitter of movement of said member past said worm wheel, both when said member is moved while said worm wheel rotates and when said member is moved while said worm wheel is locked, and a piston-and-cylinder assembly directly connected to said member for moving said member to-and-fro past said worm wheel when said worm wheel is free to rotate.

8. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, and means for automatically operating said worm wheel locking means, said automatic means being responsive to conditions depending on the movement of said member past said worm wheel while said worm wheel rotates.

9. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, said means for moving the member past the worm wheel while the worm wheel rotates being independent of said worm wheel, and means for automatically operating said worm wheel locking means, said automatic means being responsive to conditions depending on the movement of said member past said worm wheel while said worm wheel rotates.

10. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, said different conditions of movement of the member being effected one by manually actuated means and the other by a prime mover, and means for automatically operating said worm wheel locking means, said automatic means being responsive to conditions depending on the movement of said member past said worm wheel while said worm wheel rotates.

11. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, the two different conditions of movement of the member being effected one by manually actuated means and the other by a prime mover, means connected to said member and controlled as to position thereby, coupling means comprising said connection, said coupling means formed as a transmitter of movement of said member past said worm wheel, both when said member is moved while said worm wheel rotates and when said member is moved while said worm wheel is locked, and means for automatically operating said worm wheel locking means, said automatic means being responsive to conditions depending on the movement of said member past said worm wheel while said worm wheel rotates.

12. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, said means for moving the member past the worm wheel while the worm wheel rotates being independent of the worm wheel, a piston-and-cylinder assembly directly connected to said member for moving said member to-and-fro past said worm wheel when said worm wheel is free to rotate, and means for automatically operating said worm wheel locking means, said automatic means being responsive to conditions depending on the movement of said member past said worm wheel while said worm wheel rotates.

13. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, the two different conditions of movement of the member being effected one by manually actuated means and the other by a prime mover, a piston-and-cylinder assembly directly connected to said member for moving said member to-and-fro past said worm wheel when said worm wheel is free to rotate, and means for automatically operating said worm wheel locking means, said automatic means being responsive to conditions depending on the movement of said member past said worm wheel while said worm wheel rotates.

14. Movement or power transmission mechanism comprising, in combination, a worm wheel and a member formed with a thread in mesh with said worm wheel, means for moving said member past said wheel while said wheel rotates, means for locking said wheel against rotation, means for rotating said member to turn said thread thereon while said worm wheel is locked so as to cause said member to move past said worm wheel along said thread as a result of the reaction of the locked worm wheel, the two different conditions of movement of the member being effected one by manually actuated means and the other by a prime mover, means connected to said member and controlled as to position thereby, coupling means comprising said connection, said coupling means formed as a transmitter of movement of said member past said worm wheel, both when said member is moved while said worm wheel rotates and when said member is moved while said worm wheel is locked, a piston-and-cylinder assembly directly connected to said member for moving said member to-and-fro past said worm wheel when said worm wheel is free to rotate, and means for automatically operating said worm wheel locking means, said automatic means being responsive to conditions depending on the movement of said member past said worm wheel while said worm wheel rotates.

References Cited in the file of this patent
UNITED STATES PATENTS

| | | |
|---|---|---|
| 2,902,885 | Wright | Sept. 8, 1959 |
| 2,953,933 | Kashiwara | Sept. 27, 1960 |
| 2,954,754 | Flick | Oct. 4, 1960 |